United States Patent Office 3,011,304
Patented Dec. 5, 1961

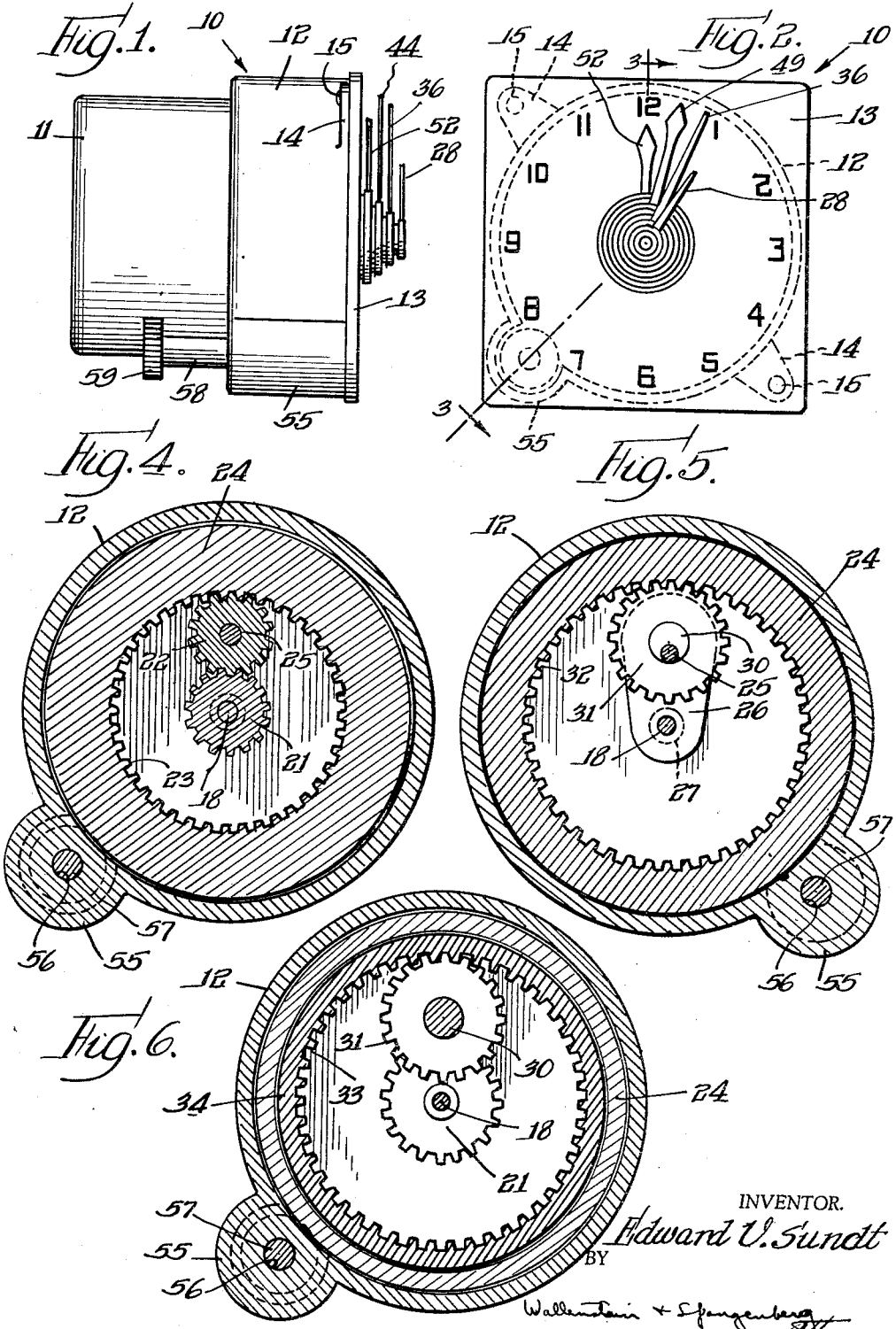

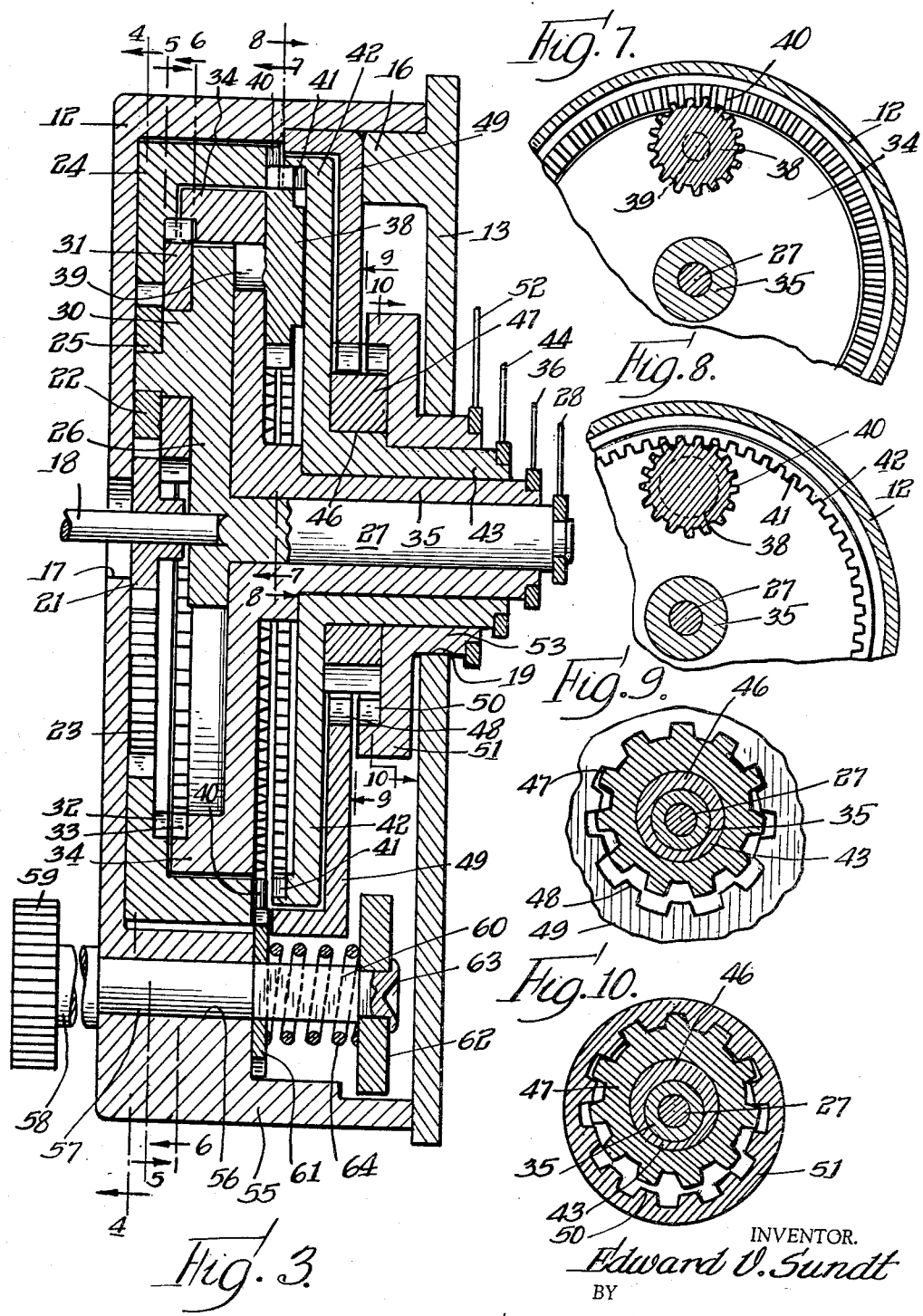

3,011,304
CLOCKWORK MECHANISM
Edward V. Sundt, Wilmette, Ill.
(1865 Miner St., Des Plaines, Ill.)
Filed Apr. 15, 1957, Ser. No. 652,994
15 Claims. (Cl. 58—26)

The principal object of this invention is to provide an improved clockwork mechanism for electric clocks having a greatly simplified reduction gear train, which may be simply and inexpensively manufactured and assembled, which is light in weight and concentric about its central axis so that the clockwork mechanism lends itself for automatic assembly and production, and which eliminates many parts conventionally used in clockwork mechanisms.

Briefly, the clockwork mechanism of this invention includes a drive shaft driven by a synchronous electric motor and rotating about a central axis of the clockwork mechanism. A planetary reducer is concentrically arranged with respect to the central axis, and it includes a drive gear driven by the shaft, a stationary internal gear, a planetary gear meshing with the drive gear and internal gear, and a carrier carrying the planetary gear and rotatable about the central axis. Preferably, the drive shaft is driven in a clockwise direction at a speed of 240 r.p.m., and the carrier of the planetary reducer is driven in a clockwise direction at 60 r.p.m.

The clockwork mechanism also includes a first planetary-differential reducer concentrically arranged with respect to the central axis and this first planetary-differential reducer includes a planetary-differential gear carried by the carrier of the planetary reducer, a stationary internal gear meshing with the planetary-differential gear, and a carrier rotatable about the central axis and having an internal gear meshing with the planetary-differential gear. This first planetary-differential reducer operates to drive the carrier thereof in a clockwise direction at a speed of 1 r.p.m.

The clockwork mechanism further includes a second planetary-differential reducer, which is concentrically arranged with respect to the central axis, and which includes a planetary-differential gear carried by the carrier of the first planetary-differential reducer, a stationary internal gear meshing with the planetary-differential gear, and an internal gear member rotatable about the central axis and meshing with the planetary-differential gear. This second planetary-differential reducer operates to rotate the internal gear member in a clockwise direction at a speed of 1 r.p.h.

The clockwork mechanism, in addition, includes a differential reducer concentrically arranged with respect to the central axis, and which, in turn, includes an eccentric driven by the internal gear member of the second planetary-differential reducer, a differential gear carried by the eccentric, a stationary internal gear meshing with the differential gear, and an internal gear member rotatable about the central axis, and meshing with the differential gear. This differential reducer operates to rotate the internal gear thereof in a clockwise direction at a speed of 1/12 r.p.h.

Indicator hands, cooperating with a clock face, are rotatable about the central axis of the clockwork mechanism, and are driven respectively by the carrier of the planetary-differential reducer, the carrier of the first planetary-differential reducer, the gear member of the second planetary-differential reducer, and the gear member of the differential reducer, for indicating the time of day.

The stationary internal gears of the planetary reducer, the first planetary-differential reducer, and the second planetary-differential reducer, are arranged on a common ring concentric with the central axis, which ring is normally stationary, but rotatable about that axis. Means are provided for manually rotating that ring for the purpose of setting the clockwork mechanism.

Further objects of this invention reside in the details of construction of the clockwork mechanism, and in the cooperative relationships between the component parts thereof.

Other objects and advantages of this invention will become apparent to those skilled in the art upon reference to the accompanying specification, claims, and drawings, in which:

FIG. 1 is a side elevational view of the clockwork mechanism of this invention associated with an electric motor;

FIG. 2 is a front elevational view looking from the right of FIG. 2;

FIG. 3 is an enlarged vertical sectional view through the clockwork mechanism taken substantially along the line 3—3 of FIG. 2;

FIG. 4 is a vertical sectional view through the clockwork mechanism looking to the left substantially along the line 4—4 of FIG. 3;

FIG. 5 is a vertical sectional view looking to the right substantially along the line 5—5 of FIG. 3;

FIG. 6 is a vertical sectional view looking to the left substantially along the line 6—6 of FIG. 3;

FIG. 7 is a partial vertical sectional view looking to the left substantially along the line 7—7 of FIG. 3;

FIG. 8 is a partial vertical sectional view looking to the right substantially along the line 8—8 of FIG. 3;

FIG. 9 is a partial vertical sectional view looking toward the left substantially along the line 9—9 of FIG. 3;

FIG. 10 is a partial vertical sectional view looking to the right substantially along the line 10—10 of FIG. 3.

The clockwork mechanism of this invention is generally designated at 10, and it includes a synchronous electric motor having a motor housing 11 suitably secured to a cup-shaped housing 12, including a compound speed reducer mechanism. The open side of the housing 12 is closed by a dial plate 13, which is held in place by brackets 14 on the housing 12, and screws 15 extending through the brackets 14 into the dial plate 13. The outer face of the dial plate 13 is provided with suitable time numerals. The dial plate 13 may also be internally provided with a rib 16 received within the housing 12 for centering the dial plate 13 with respect to the housing 12. The closed wall of the housing 12 is provided with a central opening 17 through which the shaft 18 of the synchronous electric motor extends. The dial plate 13 is also provided with a central opening 19 through which the various extensions project for operating the indicating hands with respect to the time numerals on the dial plate. The motor shaft 18 and the openings 17 and 19 are arranged concentrically with the central axis of the clockwork mechanism.

The motor for operating the shaft 18 is preferably a multipole synchronous motor, and operates to rotate the shaft 18 in a clockwise direction at a speed of 240 r.p.m. The shaft 18, in turn, operates a planetary reducer which is concentrically arranged with respect to the central axis of the clockwork mechanism. This planetary reducer includes a drive gear 21 which is carried and rotated by the rotating shaft 18, this gear 21 preferably having 12 teeth and a pitch diameter of .250 inch. A planetary gear 22 meshes with the drive gear 21, and it preferably has 12 teeth and a pitch diameter of .250 inch. The planetary gear 22 also meshes with a normally stationary internal gear 23, which is concentrically arranged about the central axis, and which is formed on a normally stationary, but rotatable, ring 24. Preferably, the stationary internal gear 23 has 36 teeth and a pitch diameter of .750 inch. The planetary gear 22 is rotatably mounted on a pin 25 formed on a carrier 26 which is rotatably mounted for rotation about the central axis, and which is provided with an extension 27 extending outwardly beyond the face plate 13 through the central opening 19. By reason of the action of the gears 21, 22 and 23, the carrier 26 is rotated in a clockwise direction at a speed of 60 r.p.m. The outer end of the extension 27 carries an indicator hand 28, which is rotated once every second. The shaft 18 extends into the carrier 26 to assist in rotatably mounting the carrier 26 for rotation about the central axis.

The clockwork mechanism also includes a first planetary-differential reducer, and it includes a pin 30 also formed on the carrier 26, and a planetary-differential gear 31 rotatably mounted on the pin 30. The planetary-differential gear 31 has wide external teeth, there preferably being 24 teeth arranged on a pitch diameter of .500 inch. The teeth on the planetary-differential gear 31 mesh with a normally stationary internal gear 32, also formed on the normally stationary, but rotatable, ring 24. Here, also, the internal gear 32 is concentrically arranged about the central axis. The stationary internal gear 32 preferably has 59 teeth and a pitch diameter of 1.250 inches. The planetary-differential gear 31 also meshes with a rotatable internal gear 33 arranged concentrically about the central axis. The rotatable internal gear 33 is formed in a carrier 34 which is mounted for rotation about the central axis, and which is provided with an extension 35 telescoping the extension 27 and extending outwardly beyond the face plate 13. The rotatable internal gear 33 preferably has 60 teeth, and a pitch diameter of 1.250 inches. Because of the relationships of the meshing gears 31, 32 and 33, and the rotation of the carrier 26 in a clockwise direction at a speed of 60 r.p.m., the carrier 34 is rotated in a clockwise direction at a speed of 1 r.p.m. The outer end of the extension 35 is provided with an indicator hand 36, and the indicator hand is rotated thereby once every minute.

The clockwork mechanism further includes a second planetary-differential reducer which is also concentrically arranged with respect to the central axis. This second planetary-differential reducer includes a planetary-differential gear 38, which is provided with a pin 39 for rotatably mounting the same in a hole in the carrier 34. This planetary-differential gear 38 has wide gear teeth, and preferably has 15 teeth and a pitch diameter of .375 inch. This planetary-differential gear 38 meshes with a normally stationary internal gear 40 also formed in the ring 24, and is also concentric about the central axis. This normally stationary internal gear 40 is preferably provided with 59 teeth and has a pitch diameter of 1.500 inches. The teeth of the internal gear 40 extend outwardly to the outer marginal edge of the ring 24, so as to provide external teeth on the ring 24 for the purpose of manually rotating the ring 24, as will be set forth hereafter. The planetary-differential gear 38 also meshes with a rotatable internal gear 41, which is concentric with the central axis, this internal gear 41 being formed in a gear member 42 provided with an extension 43 encompassing the extension 35, and extending outwardly beyond the face plate 13. The rotatable internal gear 41 is preferably provided with 60 teeth and has a pitch diameter of 1.500 inches. Because of the relationships between the gears 38, 40 and 41, and the rotation of the carrier 34 in a clockwise direction at a speed of 1 r.p.m., the gear member 42 is rotated in a clockwise direction at a speed of 1 r.p.h. The outer end of the extension 43 is provided with an indicator hand 44, and the indicator hand is rotated once each hour.

In addition, the clockwise mechanism includes a differential reducer which is also concentrically arranged with respect to the central axis. This differential reducer includes an eccentric 46 carried and rotated by the carrier 42, the eccentric 46 being preferably formed on the carrier extension 43. A differential gear 47 is rotatably mounted on the eccentric 46 and is oscillated thereby. The differential gear 47 has wide external teeth, there being preferably 11 teeth having a pitch diameter of .6875 inch. The differential gear 47 meshes with a stationary internal gear 48 formed on a ring 49 secured within the housing 12. The stationary internal gear 48 preferably has 11 teeth and a pitch diameter of .750 inch. The differential gear 47 also meshes with a rotatable internal gear 50 concentrically arranged with respect to the central axis and formed in a rotatable gear member 51 provided with an extension 53 telescoping the extension 43, and extending outwardly beyond the dial plate 13. The rotatable internal gear 50 is preferably provided with 12 teeth, and has a pitch diameter of .750 inch. Because of the relationships between the gears 47, 48 and 50, and the rotation of the gear member 42, and eccentric 46, in a clockwise direction at a speed of 1 r.p.h., the gear member 51 is rotated in a clockwise direction at a speed of 1/12 r.p.h. The outer end of the extension 53 carries an indicator hand 52, which is rotated thereby once every 12 hours.

The housing 12 for the clockwork mechanism has an outwardly extending boss 55, in turn having a hole 56, in which a shaft 57 is rotatably mounted. The outer end of this shaft 57 is provided with a shouldered portion 58, for limiting inward movement of the shaft, and also with a knurled knob 59 for rotating the shaft. The inner end of the shaft 57 has a squared portion 60 upon which is mounted a gear 61, the squared portion 60 cooperating with a square opening in the gear 61, to cause the gear 61 to rotate as the shaft 57 is manually rotated. The extreme inner end of the shaft 57 carries a washer 62, the washer being secured in place against a shoulder by riveting over the end of the shaft, as indicated at 63. A spring 64 is interposed between the washer 62 and the gear 61 for holding the shaft 57 inwardly, and for holding the gear 61 against the inner surface of the boss 55. The gear 61 meshes with the external gear 40 on the ring 24, this external gear being formed by the extension of the internal gear which meshes with the planetary-differential gear 38. The external gear 40, accordingly, also includes 59 teeth, but has a pitch diameter of 1.580 inches. The gear 61 has 12 teeth and a pitch diameter of .315 inch.

When the knob 59 is rotated, the ring 24 is rotated by the gear 61. This manual rotation of the ring 24 operates to rotate the normally stationary internal gears 23, 32 and 40, and thus operates to manually rotate the carriers 26 and 34, and the gear member 42, for manually setting the indicator hands 28, 36 and 44. Manual rotation of the gear member 42 in this manner operates through the differential reducer to manually rotate the gear member 51, and hence set the indicator hand 52. Because of the friction afforded by the spring 64, rotation of the ring 24 is normally prevented so that the internal gears 23, 32 and 40, formed therein, react against the gears 22, 31 and 38 to drive the various indicator hands at the appropriate speeds.

Because of the numbers of the teeth and the pitch diameters, the gears 21, 22 and 23 may have a substantially 48 pitch, the gears 31, 32 and 33 may have a substantially 48 pitch, the gears 38, 40 and 41 may have a substantially 40 pitch, the gears 47 and 48 may have a substantially 12 pitch, the gear 50 may have a substantially 16 pitch, and the gear 61 and external gear 40 may have a substantially 38 pitch. These numbers of teeth, pitch diameters and pitches cooperate to produce an extremely efficient clockwork mechanism. Further, the formation of the stationary internal gears 23, 32 and 40 on the common ring 24, affords great accuracy in manufacture and minimum cost, and also makes possible a simple and efficient manual setting means for the clockwork mechanism. Further, many of the parts of the clockwork mechanism serve multiple purposes, as, for example, the carrier 26 rotatably carries both the planetary gear 22, and the planetary-differential gear 31. The planetary reducer operated directly by the shaft 18 is extremely efficient in operation, and provides for maximum efficiency where it is most required. All of the parts of the clockwork mechanism are concentrically arranged about the central axis, and are assembled in layers, with a number of parts in each layer, so that the clockwork mechanism is particularly adaptable for automatic production and automation.

While for purposes of illustration, one form of this invention is disclosed, other forms thereof may become apparent to those skilled in the art upon reference to this disclosure and, therefore, this invention is to be limited only by the scope of the appended claims.

I claim as my invention:

1. A clockwork mechanism, comprising a first carrier rotating in a clockwise direction at 60 r.p.m., a first planetary-differential gear rotatably carried by the first carrier, a first stationary internal gear concentric with the axis of rotation of the first carrier and meshing with the first planetary-differential gear and having 59 teeth, a second carrier rotatable about an axis concentric with the axis of rotation of the first carrier and having an internal gear meshing with the first planetary-differential gear and having 60 teeth and rotatable in a clockwise direction at 1 r.p.m. and having a concentric extension, an indicator hand carried and rotated by the extension of the second carrier at 1 r.p.m., a second planetary-differential gear rotatably carried by the second carrier, a second stationary internal gear concentric with the axis of rotation of the first carrier and meshing with the second planetary-differential gear and having 59 teeth, a first rotatable internal gear rotatable about an axis concentric with the axis of rotation of the first carrier and meshing with the second planetary-differential gear and having 60 teeth and rotatable in a clockwise direction at 1 r.p.h. and having a concentric extension telescoping the concentric extension of the second carrier, and an indicator hand carried and rotated by the concentric extension of the first rotatable internal gear at 1 r.p.h., an eccentric carried and rotated by the first rotatable internal gear, a differential gear rotatably carried by and oscillated by the eccentric, a third stationary internal gear concentric with the axis of rotation of the first carrier and meshing with the differential gear and having 11 teeth, a second rotatable internal gear rotatable about an axis concentric with the axis of rotation of the first carrier and meshing with the differential gear and having 12 teeth and rotatable in a clockwise direction at $\frac{1}{12}$ r.p.h. and having a concentric extension telescoping the concentric extension of the first rotatable internal gear, and an indicator hand carried and rotated by the concentric extension of the second rotatable internal gear at $\frac{1}{12}$ r.p.h.

2. A clockwork mechanism, comprising a shaft rotating in a clockwise direction at 240 r.p.m., a drive gear carried and rotated by the shaft, a first stationary internal gear concentric with the shaft, the number of teeth on the stationary internal gear being three times that on the drive gear, a planetary gear meshing with the drive gear and the first stationary internal gear, a first carrier rotatably mounted concentrically with the shaft and rotatably carrying the planetary gear and rotating in a clockwise direction at 60 r.p.m., a first planetary-differential gear rotatably carried by the first carrier, a second stationary internal gear concentric with the shaft and meshing with the first planetary-differential gear and having 59 teeth, a second carrier rotatably mounted concentrically with the shaft and having an internal gear with 60 teeth meshing with the first planetary-differential gear and rotatable in a clockwise direction at 1 r.p.m. and having a concentric extension, an indicator hand carried and rotated by the second carrier extension at 1 r.p.m., a second planetary-differential gear rotatably carried by the second carrier, a third stationary internal gear concentric with the shaft and meshing with the second planetary-differential gear and having 50 teeth, a first rotatable internal gear rotatably mounted concentrically with the shaft and meshing with the second planetary-differential gear and having 60 teeth and rotatable in a clockwise direction at 1 r.p.h. and having a concentric extension telescoping the extension of the second carrier, an indicator hand carried and rotated by the first rotatable internal gear extension at 1 r.p.h., an eccentric carried and rotated by the first rotatable internal gear, a differential gear rotatably carried by and oscillated by the eccentric, a fourth stationary internal gear concentric with the shaft and meshing with the differential gear and having 11 teeth, a second rotatable internal gear rotatably mounted concentrically with the shaft and meshing with the differential gear and having 12 teeth and rotatable in a clockwise direction at $\frac{1}{12}$ r.p.h. and having a concentric extension telescoping the extension of the first rotatable internal gear, and an indicator hand carried and rotated by the second rotatable internal gear extension at $\frac{1}{12}$ r.p.h.

3. A clockwork mechanism, comprising a drive shaft rotating about a central axis in a clockwise direction, a planetary reducer concentric with the central axis and including a drive gear driven by the shaft, a stationary internal gear, a planetary gear meshing with the drive gear and internal gear, and a carrier carrying the planetary gear and rotatable about the central axis in a clockwise direction, a first planetary-differential reducer concentric with the central axis and including a planetary-differential gear carried by the carrier of the planetary reducer, a stationary internal gear meshing with the planetary-differential gear, and an internal gear member rotatable about the central axis in a clockwise direction and meshing with the planetary-differential gear, a second planetary-differential reducer concentric with the central axis and including a planetary-differential gear carried by the internal gear member of the first planetary-differential reducer, a stationary internal gear meshing with the planetary-differential gear, and an internal gear member rotatable about the central axis in a clockwie direction and meshing with the planetary-differential gear, a differential reducer concentric with the central axis and including an eccentric driven by the internal gear member of the second planetary-differential reducer, a differential gear carried by the eccentric, a stationary internal gear meshing with the differential gear, and an internal gear member rotatable about the central axis in a clockwise direction and meshing with the differential gear, and indicator hands rotatable about the central axis and driven respectively by the gear member of the first planetary-differential reducer, the gear member of the second planetary-differential reducer, and the gear member of the differential reducer.

4. A clockwork mechanism, comprising a drive shaft rotating about a central axis in a clockwise direction, a planetary reducer concentric with the central axis and including a drive gear driven by the shaft, a stationary internal gear, a planetary gear meshing with the drive gear and internal gear, and a carrier carrying the planetary gear and rotatable about the central axis in a clockwise direction, a first planetary-differential reducer concentric with the central axis and including a planetary-differential gear carried by the carrier of the planetary reducer, a stationary internal gear meshing with the planetary-differential gear, and an internal gear member rotatable about the central axis in a clockwise direction, and meshing with the planetary-differential gear, a second planetary-differential reducer concentric with the central axis and including a planetary-differential gear carried by the internal gear member of the first planetary-differential reducer, a stationary internal gear meshing with the planetary-differential gear, and an internal gear member rotatable about the central axis in a clockwise direction and meshing with the planetary-differential gear, a differential reducer concentric with the central axis and including an eccentric driven by the internal gear member of the second planetary-differential reducer, a differential gear carried by the eccentric, a stationary internal gear meshing with the differential gear, and an internal gear member rotatable about the central axis in a clockwise direction and meshing with the differential gear, and indicator hands rotatable about the central axis and driven respectively by the carrier of the planetary reducer, the gear member of the first planetary-differential reducer, the gear member of the second planetary-differential reducer, and the gear member of the differential reducer.

5. A clockwork mechanism, comprising a drive shaft rotating about a central axis in a clockwise direction, a planetary reducer concentric with the central axis and including a drive gear driven by the shaft, a stationary internal gear, a planetary gear meshing with the drive gear and internal gear, and a carrier carrying the planetary gear and rotatable about the central axis in a clockwise direction, a first planetary-differential reducer concentric with the central axis and including a planetary-differential gear carried by the carrier of the planetary reducer, a stationary internal gear meshing with the planetary-differential gear, and an internal gear member rotatable about the central axis in a clockwise direction and meshing with the planetary-differential gear, a second planetary-differential reducer concentric with the central axis and including a planetary-differential gear carried by the internal gear member of the first planetary-differential reducer, a stationary internal gear meshing with the planetary-differential gear, and in internal gear member rotatable about the central axis in a clockwise direction and meshing with the planetary-differential gear, a differential reducer concentric with the central axis and including an eccentric driven by the internal gear member of the second planetary-differential reducer, a differential gear carried by the eccentric, a stationary internal gear meshing with the differential gear, and an internal gear member rotatable about the central axis in a clockwise direction and meshing with the differential gear, and indicator hands rotatable about the central axis and driven respectively by the gear member of the first planetary-differential reducer, the gear member of the second planetary-differential reducer, and the gear member of the differential reducer, said stationary internal gears of the planetary reducer, the first planetary-differential reducer and the second planetary-differential reducer being arranged on a common normally stationary but rotatable ring, and means for manually rotating the ring to set the clockwork mechanism.

6. A clockwork mechanism, comprising a drive shaft rotating about a central axis in a clockwise direction, a planetary reducer concentric with the central axis and including a drive gear driven by the shaft, a stationary internal gear, a planetary gear meshing with the drive gear and internal gear, and a carrier carrying the planetary gear and rotatable about the central axis in a clockwise direction, a planetary-differential reducer concentric with the central axis and including a planetary-differential gear carried by the carrier of the planetary reducer, a stationary internal gear meshing with the planetary-differential gear, and an internal gear member rotatable about the central axis in a clockwise direction meshing with the planetary-differential gear, and indicator hands rotatable about the central axis and driven respectively by the carrier of the planetary reducer and the gear member of the planetary-differential reducer.

7. A clockwork mechanism, comprising a drive shaft rotating about a central axis in a clockwise direction, a planetary reducer concentric with the central axis and including a drive gear driven by the shaft, a stationary internal gear, a planetary gear meshing with the drive gear and internal gear, and a carrier carrying the planetary gear and rotatable about the central axis in a clockwise direction, a first planetary-differential reducer concentric with the central axis and including a planetary-differential gear carried by the carrier of the planetary reducer, a stationary internal gear meshing with the planetary-differential gear, and an internal gear member rotatable about the central axis in a clockwise direction and meshing with the planetary-differential gear, a second planetary-differential reducer concentric with the central axis and including a planetary-differential gear carried by the internal gear member of the first planetary-differential reducer, a stationary internal gear meshing with the planetary-differential gear, and an internal gear member rotatable about the central axis in a clockwise direction and meshing with the planetary-differential gear, and indicator hands rotatable about the central axis and driven respectively by the gear member of the planetary reducer, the carrier of the first planetary-differential reducer and the gear member of the second planetary-differential reducer.

8. A clockwork mechanism, comprising a member rotating about a central axis in a clockwise direction, a first planetary-differential reducer concentric with the central axis and including a planetary-differential gear carried by the member, a stationary internal gear meshing with the planetary-differential gear, and an internal gear member rotatable about the central axis in a clockwise direction and meshing with the planetary-differential gear, a second planetary-differential reducer concentric with the central axis and including a planetary-differential gear carried by the internal gear member of the first planetary-differential reducer, a stationary internal gear meshing with the planetary-differential gear, and an internal gear member rotatable about the central axis in a clockwise direction and meshing with the planetary-differential gear, a differential reducer concentric with the central axis and including an eccentric driven by the internal gear member of the second planetary-differential reducer, a differential gear carried by the eccentric, a stationary internal gear meshing with the differential gear, and an internal gear member rotatable about the central axis in a clockwise direction and meshing with the differential gear, and indicator hands rotatable about the central axis and driven respectively by the gear member of the first planetary-differential reducer, the gear member of the second planetary-differential reducer, and the gear member of the differential reducer.

9. A clockwork mechanism, comprising a drive shaft rotating about a central axis in a clockwise direction, a planetary reducer concentric with the central axis and including a drive gear driven by the shaft, a stationary internal gear, a planetary gear meshing with the drive gear and internal gear, and a carrier carrying the planetary gear and rotatable about the central axis in a clockwise direction, a planetary-differential reducer concentric with the central axis and including a planetary-differential gear carried by the carrier of the planetary reducer, a stationary internal gear meshing with the planetary-differential gear, and an internal gear member rotatable about the central axis in a clockwise direction and having an internal gear meshing with the planetary-differential gear, and indicator hands rotatable about the central axis and driven respectively by the carrier of the planetary reducer and the internal gear member of the planetary-differential reducer, said stationary internal gears of the planetary reducer and the planetary-differential reducer being arranged on a common normally stationary but rotatable ring, and means for manually rotating the ring to set the clockwork mechanism.

10. A clockwork mechanism, comprising a drive shaft rotating about a central axis in a clockwise direction, a planetary reducer concentric with the central axis and including a drive gear driven by the shaft, a stationary internal gear, a planetary gear meshing with the drive gear and internal gear, and a carrier carrying the planetary gear and rotatable about the central axis in a clockwise direction, a first planetary-differential reducer concentric with the central axis and including a planetary-differential gear carried by the carrier of the planetary reducer, a stationary internal gear meshing with the planetary-differential gear, and an internal gear member rotatable about the central axis in a clockwise direction and meshing with the planetary-differential gear, a second planetary-differential reducer concentric with the central axis and including a planetary-differential gear carried by the internal gear member of the first planetary-differential reducer, a stationary internal gear meshing with the planetary-differential gear, and an internal gear member rotatable about the central axis in a clockwise direction and meshing with the planetary-differential gear, and indicator hands rotatable about the central axis and driven respectively by the carrier of the planetary reducer, the gear member of the first planetary-differential reducer and the gear member of the second planetary-differential reducer, said stationary internal gears of the planetary reducer, the first planetary-differential reducer and the second planetary-differential reducer being arranged on a common normally stationary but rotatable ring, and means for manually rotating the ring to set the clockwork mechanism.

11. A clockwork mechanism, comprising a member rotating about a central axis in a clockwise direction, a first planetary-differential reducer concentric with the central axis and including a planetary-differential gear carried by the member, a stationary internal gear meshing with the planetary-differential gear, and an internal gear member rotatable about the central axis in a clockwise direction and meshing with the planetary-differential gear, a second planetary-differential reducer concentric with the central axis and including a planetary-differential gear carried by the internal gear member of the first planetary-differential reducer, a stationary internal gear meshing with the planetary-differential gear, and an internal gear member rotatable about the central axis in a clockwise direction and meshing with the planetary-differential gear, and indicator hands rotatable about the central axis and driven respectively by the gear member of the first planetary-differential reducer and the gear member of the second planetary-differential reducer, said stationary internal gears of the first planetary-differential reducer and the second planetary-differential reducer being arranged on a common normally stationary but rotatable ring, and means for manually rotating the ring to set the clockwork mechanism.

12. A clockwork mechanism, comprising a member rotating about a central axis in a clockwise direction, a first planetary-differential reducer concentric with the central axis and including a planetary-differential gear carried by the member, a stationary internal gear meshing with the planetary-differential gear, and an internal gear member rotatable about the central axis in a clockwise direction and meshing with the planetary-differential gear, a second planetary-differential reducer concentric with the central axis and including a planetary-differential gear carried by the internal gear member of the first planetary-differential reducer, a stationary internal gear meshing with the planetary-differential gear, and an internal gear member rotatable about the central axis in a clockwise direction and meshing with the planetary-differential gear, a differential reducer concentric with the central axis and including an eccentric driven by the internal gear member of the second planetary-differential reducer, a differential gear carried by the eccentric, a stationary internal gear meshing with the differential gear, and an internal gear member rotatable about the central axis in a clockwise direction and meshing with the differential gear, and indicator hands rotatable about the central axis and driven respectively by the gear member of the first planetary-differential reducer, the gear member of the second planetary-differential reducer, and the gear member of the differential reducer, said stationary internal gears of the first planetary-differential reducer and the second planetary-differential reducer being arranged on a common normally stationary but rotatable ring, and means for manually rotating the ring to set the clockwork mechanism.

13. A clockwork mechanism, comprising a member rotating about a central axis in a clockwise direction, a planetary-differential reducer concentric with the central axis and including a planetary-differential gear carried by the member, a stationary internal gear meshing with the planetary-differential gear, and an internal gear member rotatable about the central axis in a clockwise direction and meshing with the planetary-differential gear, a differential reducer concentric with the central axis and including an eccentric driven by the internal gear member of the planetary-differential reducer, a differential gear carried by the eccentric, a stationary internal gear meshing with the differential gear, and an internal gear member rotatable about the central axis in a clockwise direction and meshing with the differential gear, and indicator hands rotatable about the central axis and driven respectively by the gear member of the planetary-differential reducer and the gear member of the differential reducer, said internal gear of the planetary-differential reducer being arranged on a normally stationary but rotatable ring, and means for manually rotating the ring to set the clockwork mechanism.

14. A clockwork mechanism, comprising a carrier rotating about a central axis in a clockwise direction at 1 r.p.m., a planetary-differential gear rotatably carried by the carrier and arranged wholly outside of the axis of rotation, a stationary internal gear concentric with the axis of rotation of the carrier and meshing with the planetary-differential gear and having 59 teeth, a first rotatable internal gear rotatable about an axis concentric with the axis of rotation of the carrier and meshing with the planetary-differential gear and having 60 teeth and rotatable in a clockwise direction at 1 r.p.h. and having a concentric extension, and an indicator hand carried and rotated by the first rotatable internal gear extension at 1 r.p.h., an eccentric carried and rotated by the first rotatable internal gear, a differential gear rotatably carried by and oscillated by the eccentric, a stationary internal gear concentric with the axis of rotation of the member and meshing with the differential gear and having 11 teeth, a second rotatable internal gear rotatable about an axis concentric with the axis of rotation of the carrier and meshing with the differential gear and having 12 teeth and rotatable in a clockwise direction at $\frac{1}{12}$ r.p.h., and having a concentric extension telescoping the concentric extension of the first internal gear, and an indicator hand carried and rotated by the second rotatable internal gear extension at $\frac{1}{12}$ r.p.h.

15. A clockwork mechanism, comprising a member rotating about a central axis in a clockwise direction, a planetary-differential reducer concentric with the central axis and including a planetary-differential gear carried by the member and arranged wholly outside of the axis of rotation, a stationary internal gear meshing with the planetary-differential gear, and an internal gear member rotatable about the central axis in a clockwise direction and meshing with the planetary-differential gear, a differential reducer concentric with the central axis and including an eccentric driven by the internal gear member of the planetary-differential reducer, a differential gear carried by the eccentric, a stationary internal gear meshing with the differential gear, and an internal gear member rotatable about the central axis in a clockwise direction and meshing with the differential gear, and indicator hands rotatable about the central axis and driven respectively by the gear member of the planetary-differential reducer and the gear member of the differential reducer.

References Cited in the file of this patent

UNITED STATES PATENTS

| | | |
|---|---|---|
| 687,173 | Upton | Nov. 19, 1901 |
| 1,633,052 | Watts | June 21, 1927 |
| 2,198,826 | Lansing et al. | Apr. 30, 1940 |
| 2,259,731 | Burtnett | Oct. 21, 1941 |
| 2,303,365 | Karlsen | Dec. 1, 1942 |
| 2,494,368 | Steele et al. | Jan. 10, 1950 |
| 2,737,064 | Stoeckicht | Mar. 6, 1956 |